2,992,995
ALKALINE COMPOSITION FOR CLEANING METAL

Benjamin Arden, Los Angeles, Calif., assignor, by mesne assignments, to Purex Corporation, Ltd., a corporation of California
No Drawing. Filed May 25, 1955, Ser. No. 511,096
6 Claims. (Cl. 252—152)

This invention relates to removal of deposits on metallic parts, e.g., in the removal of deposits in the form of lead and other metal oxides and salts and carbon deposits. A particularly useful application of my invention is the removal of such deposits when found singly or in combinations of any two or all of such deposits. This invention is concerned with novel procedure and compositions for the removal of such deposits.

One important present application of my invention is to power plants of modern aircraft, particularly jet engines, such as turbojet and turboprop power plants, which are constructed from special heat resistant alloys and super-alloys. During service, the various component parts are exposed to high operating temperatures in the vicinity of 1000–1500° F. or even higher. At these elevated temperatures the metal alloys are exposed to both reducing and oxidizing atmospheres at various times and, as a result, very tightly adherent scale deposits are formed on the hot parts of the engine.

Examples of components of jet engines which are covered with scale deposits are the combustion chamber inner liner, cross-ignition tubes, transition liner, turbine nozzle assembly, and turbine rotor assembly (with attached buckets), exhaust components, and, in some models, the after burner.

The types of scale formed on these engine parts include leaded scale, such scale being composed essentially of lead compounds such as the oxides and halides of lead, e.g., $PbO$, $PbO_2$, $Pb_2O_3$, $Pb_3O_4$, and under some conditions some free lead, and $PbX_2$ where X is a halogen such as chlorine or bromine and in many cases it may also include other salts such as phosphates and carbonates. Such deposits are also found on certain component parts of the piston type of internal combustion engines powered by leaded fuels. These salts will vary in color from white to yellow, orange, red, and brown. The composition of the deposit depends in large part on the composition of the fuel and the atmospheric environment in which it is burned, for example, fuels containing tetraethyl lead, organic halides, and organic phosphates such as tricresyl phosphates.

These deposits are also modified by organic additives which enter the combustion chamber, especially in reciprocating engines, with the lubricant and which combine with the lead to form various components of the deposits. Deposits thus formed by burning of fuels containing lead compounds are in this specification and these claims referred to as "leaded deposits."

Leaded deposits are thus formed at elevated temperatures because of the presence of lead-containing antiknock compounds in aviation (or other) fuel, and such deposits are frequently formed on metal surfaces which are covered with heat scale with which the leaded deposits are commingled and on which the leaded deposits may be found.

Also formed on the surface of the engine parts is a tough carbon or graphite scale which tightly adheres to the metal surfaces. In describing these scales as carbon or graphite scales I do not exclude the presence in the carbon deposit of high molecular weight asphaltene or asphaltic or tarry binders which are formed in the burning of the fuel. These deposits are found both intermingled with and deposited on the heat scale and leaded deposits. In many cases massive carbon deposits are formed because of severe conditions of engine operation, especially in the case of "hot" spots. The heat scale formed on components of jet engines and other types of engines operating at high temperature under oxidizing conditions is a scale of oxide character known as "heat scale," which is deposited because of high temperature oxidizing conditions. Thus, at high temperatures of operation, e.g., existing in operation of jet engines, a heat scale is formed which is largely a mixture of the oxides of the metals or of the metal alloys of which the engine parts are constructed. The relative proportions of the various oxides of which such heat scale is composed may approach but need not correspond exactly with the percentages of the parent metals in the alloy. For example, in the case of Inconel (a nickel base alloy) it appears most probable that the heat scale is largely a mixture of oxides with nickel oxide the major component. On stainless steels, the initial scale formed may be of the nature of an iron oxide-chromic oxide spinel. Also formed on the metal surfaces of aircraft engine parts during service are smut deposits. These hot scale deposits are fused oxide layers of refractory nature and highly resistant to chemical and mechanical attack.

The chief alloys used for jet engine components and on which the above-noted scales or deposits are formed include stainless steels, e.g., of the chromium or chromium-nickel type, and heat resistant alloys and super-alloys including nickel base and cobalt base alloys, iron-chromium-nickel alloys, and cobalt-nickel-chromium alloys. The aforementioned deposits may also be formed on other types of alloys. They are thus to be distinguished from ordinary rust produced by corrosion of mild steel and iron in their physical and chemical nature and are much more refractory and difficult to remove by alkaline reagents.

For proper maintenance of the engines, overhaul procedures must be applied during which the engine components are completely and safely cleaned of heat scale deposits and any other contamination which may be present such as leaded deposits and deposits of carbon. One of the most important reasons for removing the foreign matter and scale deposits is to provide clean metal surfaces which are suitable for inspection for flaws by standard techniques. Inspection is especially important for jet engine parts which are highly stressed, such as nozzle guide vanes and turbine buckets.

Conventional procedures for cleaning jet engine hot section components during overhaul are based on a combination of inadequate chemical cleaning methods plus mechanical cleaning, which includes grit blasting and liquid honing (or vapor blasting). Thus, for example, a conventional procedure may include use of a chlorinated solvent, either hot or cold, followed by a caustic dip, then a permanganate treatment, and finally vapor or sand blasting. However, these procedures have proved inadequate. The carbon deposits formed during engine operation are hard adherent deposits which are not removed by conventional methods using chlorinated solvent type carbon removers or hot tank alkaline cleaners. The treatment is time consuming and expensive both in material and manpower. Permanganate when used as a cleaning agent on parts carrying leaded deposits or carbon precipitates a brown deposit which adds to the leaded and carbon deposits and heat scale and which makes cleaning of the part even more difficult. It is believed that this is due to the reducing action of the residual carbon and also perhaps due to the action of residual leaded deposits. Furthermore, the resistant and highly refractory heat scale is not removed by such treatment. As a result of the foregoing and other deficiencies, the procedures frequently fail to provide clean surfaces for inspection since fine cracks are filled with abrasive or cold flow of metal may have sealed a crack, thus preventing absorption of penetrant during an inspection cycle.

One object of the invention is to remove leaded deposits formed on engine components, particularly, but not exclusively, the "hot" sections of aircraft engines, especially jet engines.

Another object is to devise a procedure and compositions for the efficient removal of leaded deposits, carbon, and heat scale from parts carrying the same.

Still another object is to provide procedure and compositions for cleaning surfaces of metal components of engines, particularly aircraft engines, encrusted with leaded oxide deposits carbon and/or heat scale to enable suitable inspection of the parts by production-line methods utilizing penetrant dyes or fluorescent materials.

A still further object of the invention is the provision of a method and compositions for accomplishing such descaling without producing any substantial or even measurable corrosion of the metal part during the cleaning or descaling cycle so as to incur no significant weight loss or dimensional change of the metal or alloy of which the engine component is formed.

Yet another object is to devise procedure and compositions adapted to remove, particularly, carbon deposits from engine parts, while at the same time achieving removal of any leaded deposits (i.e., lead oxides, lead salts or free lead) and heat scale also present.

Other objects and advantages will be apparent from the description of my invention which follows:

I have found that leaded deposits, and also some carbon and heat scale can be removed from engine parts, such as jet engine "hot section" components, by treatment of such parts in an alkaline solution at elevated temperature and containing a salt of an acid forming a complex with lead, the solution being highly alkaline and having a pH not less than about 13. The metals and alloys previously referred to are stable and not corroded in any substantial degree in solutions of such alkalinity.

The lead complex formerly employed can be an aliphatic hydroxy acid or a low molecular weight fatty acid, and strong alkalies such as alkali metal hydroxides are utilized to produce the desired high alkalinity. Temperature of treatment in the solution is generally in excess of about 200° F. While the aforementioned composition is sufficient in itself particularly for successful removal of leaded deposits on engine parts, such reagents have but limited value in removal of carbon deposits and of heat scale.

I have also found that the addition of phenol compounds and/or alkanolamines, particularly polyalkanolmonoamines and polyalkanolpolyamines, to the treating bath, as described more fully hereinafter, improves the action of the bath on the parts especially as regards carbon and heat scale removal.

Treatment of engine parts contaminated with scale, as described above, in the invention solutions or compositions preferably also containing an alkanolamine for relatively brief periods, affords (1) complete removal of adherent leaded deposits, (2) removal of carbon deposits, and (3) removal of heat scale and conditioning of any residual amounts of the heat scale so as to render the latter susceptible to easy removal by simple chemical follow-up cleaning, whenever necessary.

The aqueous alkali solution of the invention contains, as its alkalinity producing agent, an alkali metal compound which in solution gives free alkali metal hydroxide which may be potassium or sodium hydroxide. Potassium hydroxide is preferred although sodium hydroxide is also suitable. A substantial amount of alkali of this type is employed in order to attain the high pH values necessary for proper functioning of the solution. The pH of the descaling solution hereof is maintained substantially above 12, and is generally not less than about 13. Solutions of alkali which are preferred have values of the pH of the solution above about 13, and may be 14 or even higher. Actually, at such high pH values, it is more common practice to describe the alkalinity in terms of percent sodium hydroxide or potassium hydroxide or some other equivalent alkali metal hydroxide. The amount of alkaline material employed may range to give in solution free alkali metal hydroxide equivalent to from about 4% to about 40% by weight alkali metal oxide, e.g., ($K_2O$, $Na_2O$) based on the weight of the solution. Preferably, from about 10–25% of alkali, most desirably potassium hydroxide, is used to obtain the desired high alkalinity.

In the highly alkaline solutions are incorporated compounds in the form of certain salts, to act in conjunction with the alkali for converting leaded deposits to highly soluble lead complexes. Such agents are herein referred to as lead complexing agents. These salts are derived from an aliphatic hydroxy acid such as lactic, citric, trtaric, gluconic, glyceric, malic, glycollic acid, and saccharic acid. These salts or mixtures of these salts may be employed for the above purpose. Low molecular weight fatty acid such as acetic or propionic acid form soluble compounds of lead. These salts, while having activity in converting the lead into a soluble form, are not as useful for this purpose in the solutions of my invention as are the salts of the hydroxy acids referred to above. They may be used effectively particularly if used together with the hydroxy acids. The soluble salts of the above acids are employed, preferably employing the potassium or sodium salt, for example, potassium or sodium acetate or potassium or sodium glycollate. The quantity of these complexing salts added to the solution may vary, but generally from about 1 to about 45% by weight of such salts be present in the treating solution in water, amounts of about 4 to about 40% usually being employed. These salts can be used separately or in admixture with each other.

Reagents of the above composition are particularly useful in removal of leaded deposits, but will not completely remove the heavy heat scale or the heavy carbon deposits frequently found with such leaded deposits.

While the invention is not to be limited as to any theory of operation, the following is given as applicant's theory of the function of the highly alkaline solution hereof for the removal of leaded deposits from metallic engine parts. The high concentration of alkali metal hydroxide converts the leaded deposits to plumbite and plumbate salts. This conversion takes place more readily at high alkali concentration. However, the rate of penetration is slow and the conversion of the leaded deposits to solubles and easily removable lead compounds is incomplete.

The combined action of alkali and complex ion formation by reaction with the lead complexing agents rapidly converts massive and adherent lead oxide and salt deposits, essentially insoluble or difficultly soluble in water or dilute alkaline solutions, to soluble forms of lead compounds. The conversion to the soluble lead form is materially aided by the presence of the complexing salts. In addition to the chemical dissolving action, leaded deposits in direct contact with the metallic or scaled metallic surface, are loosened to such a degree that rinsing procedures with water, preferably by pressure rinse with water or steam pressure, knocks off these remaining leaded deposits completely. The above treatment is effective to remove leaded deposits usually encountered in engines.

To achieve removal of stubborn leaded deposits which are not completely removed by the above treatment, or to increase the rate of the removal of leaded deposits, the treating composition is controlled to provide a material which may be operated consistently as a water solution at high operating temperatures in the range of about 220° to 300° F. Particularly for removal of leaded deposits, solution temperatures of about 235° F. to 280° F. are generally maintained with a preferred temperature range of about 255 to 275° F. An important additional effect of maintaining alkalinity of the solution at high pH values noted above and of the presence of the complexing agent, is that it raises the boiling point, i.e., reduces the vapor pressure of the solution.

Over a period of time, with reuse of the solution on parts to be cleaned, at the high temperatures of operation noted above, water evaporates from the solution of the alkali and complexing agent referred to above and care must be taken to be sure that the concentration of the alkali and salts does not become so excessive as to cause precipitation on the parts to be cleaned. Evaporation is reduced to a practical controllable minimum to permit reuse of the solution by the use of from about 30 to 65% by weight of water in the solution, generally about 35 to 50% by weight of water, in conjunction with a high boiling compatible (or water soluble) organic solvent having a low vapor pressure at the temperatures up to about 300° F. Such solvents can be polyols or alkanolamines. Examples of suitable polyols, particularly diols and triols, along with their boiling points and vapor pressures (at 20° C.) of the chemically pure compound are as follows:

TABLE I

| Name | Boiling Pt. at 760 mm. pressure | | Vapor pressure, mm. Hg at 20° C. |
|---|---|---|---|
| | ° C. | ° F. | |
| ethylene glycol | 198 | 388 | 0.05. |
| diethylene glycol | 255 | 442 | less than 0.01. |
| triethylene glycol | 291 | 524 | Do. |
| dipropylene glycol | 232 | 417 | Do. |
| glycerol | 290 | 522 | Do. |
| Sorbitol | M.P. 97° C. | | vapor pressure in 70% aqueous solution less than 0.01. |

The compatible polyols and alkanolamines which I prefer to use for purposes of the invention are the polyols and alkanolamines and preferably polyalkanolamines or mixtures thereof or technical grades thereof having boiling points, in pure state, of about 400° F. and higher and having preferably a vapor pressure at 20° C. of less than 0.01 mm. of mercury. By compatible polyols and alkanolamines I mean those which form stable dispersions or solutions in the water system of the composition of my invention at the operating temperatures of 200 to 300° F. and are not decomposed by pyrolysis at such temperatures under the conditions of proposed use. Examples of the polyalkanolamines with their boiling points and vapor pressures (at 20° C.) of the pure compounds are set out below.

TABLE II

| Name | Boiling Pt. at 760 mm. pressure | | Vapor pressure, mm. Hg at 20° C. |
|---|---|---|---|
| | ° C. | ° F. | |
| Diethanolamine | 250 | 480 | less than 0.01. |
| Triethanolamine | 360 | 680 | Do. |
| N-Aminoethyl Ethanolamine | 244 | 471 | Do. |
| N-Methyl diethanolamine | 247 | 476 | Do. |
| N-Ethyl diethanolamine | 252 | 485 | Do. |
| Diisopropanolamine | 249 | 480 | Do. |
| Triisopropanolamine | 306 | 583 | Do. |

Other suitable polyalkanolmonoamines are N,N-dihydroxyethyl glycine, and glycol or polyglycol derivatives of triethanolamine and polyetherglycol derivatives of triethanolamine having the general constitutional formula

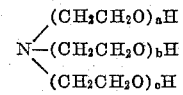

where $a+b+c$ equals from 3–6, both inclusive.

I may also use polyalkanolpolyamines having boiling points above 400° F. and similar low vapor pressures such as the polyalkanolpolyamines referred to below. I may use such polyalkanolpolyamines in the place of the polyalkanolmonoamines or the polyols in like weight proportions or employ the polyalkanolpolyamines together with the polyalkanolmonoamines in the ratio and manner described hereinbelow to assist and improve the carbon and heat scale removal and with equal effectiveness remove the leaded deposits.

As between the polyols and alkanolamines, the latter are preferred for reasons pointed out more fully below. However, it is understood, of course, that one or more of these solvents may be employed in admixture. For example, a polyalkanolamine such as triethanolamine can be employed together with a polyol such as ethylene glycol in the same alkali treating solution according to the invention.

The alkali solution containing a lead complexing agent and polyol solvent, as described above, is highly effective for removal of leaded deposits and also removes some of the carbon and smut deposits. However, when an alkanolamine such as triethanolamine is employed as solvent in the alkali solution, such solvent has the additional effect of enhancing carbon and heat scale removal, so that a more thorough descaling in this respect is accomplished.

The amount of high boiling compatible solvent which can be employed generally ranges from about 1 to about 30% by weight of the solution, and usually is in the range of about 5 to 25%, by weight, with about 10 to 25% preferred when employing polyalkanolamines as the solvent. When using polyalkanolpolyamines, the amount employed will depend on their solubility and if insufficiently soluble the polyamines can be supplemented by addition of polyalkanolmonoamines. However, the quantity of solvent used can be varied as desired, in conjunction with the concentration of alkali and lead complexing salt present, to obtain a solution having the desired characteristics. The preferred organic solvent is one with boiling point ranging above about 400° F. and having other properties such as efficacy in removal of carbon and heat scale described herein.

Phenols in the form of alkali metal phenates such as the potassium and sodium phenates, when added to the solutions of the invention, aid substantially in promoting carbon removal. Thus, I may employ the phenols, i.e., the monatomic phenols such as hydroxybenzene and its homologues including cresol and cresylic acid, polyatomic phenols such as the dihydroxybenzenes and its homologues, triatomic phenols such as pyrogallol and its homologues, and higher polyphenols, which are sufficiently acid to form salts with alkali at the concentrations employed which are soluble in the aqueous compositions of my invention at the temperature of the treatment, to wit, at 200–300° F. The alkali metal salts I have found effective in this respect are the salts of phenol itself, the ortho, meta and para dihydroxy benzenes, and of the trihydroxy benzenes such as pyrogallic acid. These materials are generally compatible with my alkali solutions. Hence, such materials can be employed as additive to the treating reagent. It may be used in place of the polyols or alkanolamines to give some improvement effective in further aiding carbon removal and assist in raising the boiling point, i.e., suppress the vapor pressure of the solution. Such phenates may be employed in amounts ranging up to about 20% by weight of the solution, generally about 3 to 15%. However, the addition of the polyols or alkanolamines to such solutions gives a large improvement in the removal of the carbon deposits and of the leaded deposits and of heat scale.

The alkanolamines in addition to their effect on the boiling point of the solutions have in themselves an influence on the chemical reactivity of the solution in removal of leaded deposits and heat scale and carbon deposits. The effectiveness of the alkanolamines on the removal of leaded deposits and heat scale is greatly enhanced by maintaining suitably high concentrations of the alkanolamines and of alkali in the treating solution in addition to suitable concentrations of the salts of the hydroxy acid or low molecular weight fatty acid, and preferably also employing salts of the hydroxy acids when using the low molecular weight fatty acid salts as the complexing agent.

The compositions of my invention containing alkanolamines or its equivalent alcoholates include from about 10 to about 25% of alkali metal hydroxide, about 4 to about 40% of complexing agent, from 0 to about 15% of phenates and when employing alkanolamines from about 10 to about 25% of alkanolamines and sufficient water to make 100% by weight, the amount of water ranging from about 25 to about 80%. As a further improvement, I may adjust the above ratios of the components of the composition so that there is little and preferably an inconsequential amount of water evaporated at the treating temperature. The above mixtures have a boiling point which is in the range up to 220° F. where only the alkali and complexing agent and no organic solvent is used and from about 220 to over 300° F. where the alkanolamine or polyol is used and water in amount ranging from about 30 to about 60% of the solution is used, all percentages being by weight of the solution. The boiling point is preferably higher than the average temperature of the cleaning solution as employed in the process.

While I do not desire to be bound by any theory of the reaction, I do not exclude the possibility that more or less of the alkanolamines in the alkaline aqueous solutions are converted to the equivalent alcoholate.

In employing the above ingredients to form the alkaline solution, I may adjust the quantities so that the alkali employed may be divided between free alkali and alkali bound as alcoholate of the polyalkanolamine and dissolve the mixture in water.

As an illustration but not as a limitation of the above compositions, the following is given by way of example:

Example 1

| Ingredient: | Parts by weight |
| --- | --- |
| Alkali metal salt of an aliphatic hydroxy acid | From about 15 to about 30 |
| Alkali metal salt of a lower molecular weight fatty acid | From about 2 to about 15 |
| Alkali metal hydroxide | From about 10 to about 25 |
| Polyalkanolamine | From about 10 to about 25 |

Water is added to make 100% by weight in an amount above about 25% by weight of the mixture.

The alkali metal salt of the lower weight fatty acid is used as an extender to diminish the cost of the complexing agent. The salts of the hydroxy acids, particularly the tartrates, citrates, glycollates, and lactates, are much more effective than the salts of the lower molecular weight fatty acid and these may be omitted by increasing the proportion of the salts of the hydroxy fatty acids, for example, in equal amount by weight.

In practice, the treating and removing composition of the invention is heated in a suitable container or tank, e.g., constructed of stainless steel or Monel metal, to the operating temperature, and the engine parts encrusted with leaded deposits, carbon, and heat scale deposits are immersed therein. Temperature of the solution during treatment is maintained in the range of 200–300° F. usually 235 to 280° F. The preferred temperature range is about 255 to 280° F. The solution has a boiling point higher than the treating temperature and is in excess of about 220–300° F. and usually about 300° F. Where the tank is heated by steam coils, the temperature adjacent the coils may be above the boiling temperature; however, the average temperature of the solution is as stated. The time of treatment in the above alkaline solution is generally from about 15 minutes to about 2 hours, depending on the amount and tenacity, particularly as regards, carbon, of the scale to be removed. Usually from 30 to 45 minutes at about 270° F. is sufficient for this purpose. The parts are then withdrawn from the solution and spray rinsed with either cold or warm water.

The alkali solutions described above for removing the deposits produce no measurable corrosion of the metal of which the engine part is constructed, during the cleaning operation. Hence, no weakening or dimensional change in the metal part is effected by the invention process.

I may employ in my process, in place of the alkanolamines referred to above, their equivalent in the form of the alcoholate as for example the sodium or potassium salt of the corresponding alcoholate.

Thus, although I do not wish to be bound by any theory of the chemistry of the process, it is my view the alkanolamine in alkaline solution, and this includes the alkali alcoholate equivalent, as well as having the physical effect of raising the boiling point of the solution, reacts chemically to assist the alkali and the complexing salts in forming complexes of the metal atoms of the heat scale and leaded deposits and thus the alkanolamines aid the lead complexing salts in the removal of the leaded deposits. I have observed that alkanolamines when added to the alkali mixtures containing the complexing agents in the form of the salts of the hydroxy fatty acids enhance the action of the reagent. In so doing, the reactivity is many times greater when the mixture of the complexing agent and the alkanolamine is used, over that obtained by using the alkali and the alkanolamine or the alkali and the complexing agent in the same service.

In many cases, the above treatment is sufficient to remove the leaded deposits, carbon, and heat scale. Where, however, the heat scale is not removed, the previous treatment will condition the heat scale so that it is readily removed by washing the treated part and by a following treatment employing alkaline permanganate solution.

The alkaline permanganate bath, like the alkali scale removing solutions of the invention described above, is not corrosive to the alloys and metals generally used in constructing engine parts. The composition of such an alkaline permanganate bath may be, for example, any one of the following:

COMPOSITIONS FOR ALKALINE PERMANGANATE SOLUTION (I)

| | Percent |
| --- | --- |
| Sodium hydroxide (16–20 oz. 1 gal.) | 10 |
| Sodium carbonate (16–20 oz. 1 gal.) | 10 |
| Potassium permanganate (7–10 oz. 1 gal.) | 6 |
| Water | 74 |

(II)

| | |
|---|---|
| Sodium hydroxide | 20.0 |
| Sodium carbonate | 5.0 |
| Potassium permanganate | 5.0 |
| Water | 70 |

(III)

| | |
|---|---|
| Sodium hydroxide | 20.0 |
| Potassium permanganate | 5.0 |
| Water | 75.0 |

The range employed is as follows:

Sodium hydroxide _____ About 10 to about 20%.
Potassium permanganate ____ 3 to 12%.

to which may be added sodium carbonates in range of about 5 to 10% if it is desired, although it is not essential. Instead of sodium hydroxide and potassium permanganate, their potassium or sodium analogues may be used in chemically equivalent proportions.

I may employ any of the permanganate solutions heretofore employed or specified for such cleaning service in prior art processes and thus produce parts completely cleaned of heat scale in a relatively short time, where such permanganate solutions employed in the prior art process are in themselves ineffective in such periods of time and require prolonged treating times and mechanical abrading methods, and which frequently fail to produce cleaning when the present invention is successful in relatively short periods of time. The parts are immersed in the alkaline permanganate bath, maintained, e.g., at 190–210° F. for say ½ to 1½ hours. The parts are then removed, rinsed by dip or spray with water, and then brightened to remove manganese dioxide stains and smut by immersion for about 5 to 15 minutes in a 20 to 25% solution of nitric acid at ambient temperature, or a repeated treatment in the treating solutions of my invention, containing the polyalkanolamines.

It is noted that the alkaline permanganate bath is not effective per se for rapid removal of leaded deposits, heat scale or carbon deposits. I have found that it is generally useful only after the leaded deposits, carbon deposits, and heat scale have been substantially removed or conditioned by treatment in the alkali solutions containing the polyalkanolamines of the invention described above.

While the process and solutions described above employing the polyalkanolmonoamines for removal of leaded deposits also are effective for removal of carbon deposits and heat scale, in many instances extremely hard, massive, and highly adherent carbon deposits and heavy glazed layers of heat scale are formed during severe conditions of engine operation, which are most difficult to remove by the above procedures without exposing the parts for prolonged and impractical and inconvenient periods of time.

I have found that by addition of a polyalkanolpolyamine to the above alkali solutions containing the lead complexing agents, tenacious carbon deposits often formed on hot parts of engines, particularly jet engines, may be rapidly and completely removed. When using the polyalkanolpolyamines, substantially all of the heat scale is in many cases also completely and efficiently removed in a relatively short time of treatment in such solutions. When the heat scale is tightly adherent refractory and particularly if glazed over so that it is not completely removed during the above treatment, the treatment conditions the scale so that it is completely and cleanly removed by a final treatment with alkaline permanganate solution. Sometimes to remove any smut left by the permanganate solution a treatment with acid such as nitric acid or a second treatment with the polyalkanolamine solution of my invention completes the cleaning treatment to remove all of the residual heat scale. The amount of the polyalkanolpolyamines to be added is decreased by employing the polyalkanolpolyamines together with the polyalkanolmonoamines as described herein and in my preferred embodiment. The result is an improvement in over-all cleaning ability and performance particularly in the rate of removal of the carbon and heat scale.

Examples of suitable polyalkanolpolyamines for purposes of the invention are as follows:

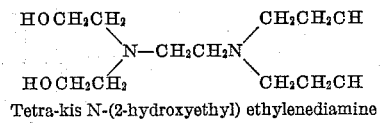

Tetra-kis N-(2-hydroxyethyl) ethylenediamine and

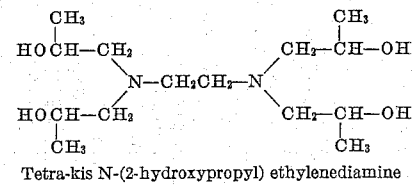

Tetra-kis N-(2-hydroxypropyl) ethylenediamine

Additional examples are N,N'-dihydroxyethyl ethylene diamine, tetraethanol propylene diamine, pentaethanol diethylenetriamine and hexaethanol triethylenetetramine. Substituted polyalkanolpolyamines may be used. Preferably, however, they should not be so extensively substituted as to disadvantageously impair their solubility and stability in the alkaline solution or to disadvantageously alter their characteristic as a polyalkanolpolyamine. Thus, where one or more than one of the alkanol groups is replaced by a carboxyl group, I may use, for example, Di N-hydroxyethyl ethylene diamine diacetic acid and N,N-dihydroxyethyl glycine. The preferred compounds of this type are the polyalkanoldiamines, in particular N,N,N',N'-tetra-kis (2-hydroxypropyl) ethylenediamine and the 2-hydroxyethyl analog.

The amount of polyalkanolpolyamine employed can vary. When used together with polyalkanolmonoamines the amount generally used being in the range of about 0.2 to about 5% by weight of the solution, employing therewith additional polyalkanolmonoamines sufficient to make the total polyalkanolamine content preferably equal to about from 10 to 25% by weight of the solution. Preferably, I employ from about 1 to about 5% by weight of the polyalkanolpolyamines and from about 9 to about 22% by weigth of the polyalkanolmonoamines based on the weight of the solution. The quantity of this material which can be utilized will, of course, be limited by the solubility of the polyalkanolpolyamine employed.

Practically 100% removal of leaded deposits is obtainable by use of my alkali solutions containing the complexing agent, within the above-noted periods of treatment. Using the solutions which do not contain the polyalkanolpolyamine, the amount of carbon removal may be between 75 and 90%, depending on the density and the character of the carbon deposit, whereas practically 100% of the carbon of the hard and dense kind encountered in extreme cases can be removed under the same conditions but employing alkali solutions including a polyalkanolpolyamine such as N,N,N',N'-tetrakis-(2 hydroxypropyl) ethylenediamine. I have found that (depending on the character of the carbon deposit) employing the solutions of my invention containing polyalkanolamines and not containing polyalkanolpolyamines, I may remove about 100% of the carbon deposit encountered in jet engines and about 75% of the carbon found in jet engines operating under adverse conditions. However, such solutions will remove only about 40 to 50% of the heat scale, and will condition the remainder of the heat scale for removal by treatment with permanganate followed by treatment with nitric acid or retreatment with the polyalkanolamine solutions of my invention. However, when adding the polyalkanolopolyamine I may remove 100% of all types of carbon deposits, even of the most resistant character found in jet engines, and will remove 60 to 70% of the heat scale and condition the remainder for removal by the permanganate treatment previously described. The treatment employing solutions containing polyalkanolpolyamines conditions the heat scale which is not removed by the treatment with the reagents of my invention containing the polyalkanolpolyamines so that any residual heat scale which still remains following treatment with the polyalkanolpolyamines in my alkali solutions according to the invention can be removed by treatment of the parts in a solution such as alkaline permanganate bath.

I may, however, treat the part in stages. Thus, I may first treat the part with an alkali solution containing the complexing agent and no polyol or polyalkanolamine or polyalkanolpolyamine at relatively moderate temperatures, for example, 180–220° F., and remove a major amount of the leaded deposits and such light heat scale and carbon which is relatively loosely attached. I may then follow the treatment with a second treatment with the compositions of my invention containing the aforesaid organic reagents in the manner described above to produce a complete removal of the obdurate highly resistant leaded deposits and carbon, and part of the heat scale; or I may employ as an initial treatment the compositions of my invention containing the polyols and/or polyalkanolmonoamines in the manner described above and follow this treatment with the compositions of my invention employing the polyalkanolmonoamines and also the polyalkanolpolyamines, employing them in the manner described herein. The final treatment with permanganate and if necessary followed by treatment with nitric acid or retreatment with the polyalkanolpolyamine solutions will produce a clean and bright part. By this procedure, I may reduce the time of treatment with each reagent, and also I economize in the use of the more expensive organic reagents.

The following examples are given to illustrate the application of my invention employing the various treating reagents and the comparative results obtained.

*Example 2*

A combustion chamber inner liner having a heavy leaded deposit and heat scale and carbon was treated with the following solution at 200–210° F. in the manner described in connection with Example 1.

| | Percent |
|---|---|
| Sodium hydroxide | 16.0 |
| Sodium acetate | 1.6 |
| Potassium sodium tartrate | 2.4 |
| Water | 80.0 |
| | 100.0 |

It required 15 minutes to remove the leaded deposit and after 1 hour of treatment but a fraction, estimated as from 5–10%, of the lightly adherent carbon and heat scale was removed. Lightly adherent carbon was washed off, but the hard graphitic carbon forming the major portion of the carbon deposit and heat scale were not removed, nor was it removed after 1½ hours of exposure.

The same treatment applied to an exhaust system collector ring of an internal combustion engine required 1½ hours for complete removal of the leaded deposit.

Subsequent treatment with permanganate and with nitric acid as in Example 5 will not remove the scale completely and it requires excessive time (up to several hours) to remove less obdurate scale which remains after the treatment with the alkali and complexing agent with the highly adherent scale untouched.

*Example 3*

Comparing this result with the use of caustic soda alone (15% solution at 200–210° F.), a similar combustion chamber inner liner, taken from an engine operating under the same conditions and like service and having a closely similar type of deposit as in the above case, required 1 hour for removal of most of the loosely adherent leaded deposit but the underlying or tightly adherent leaded deposits were not removed and only a fraction of the adherent carbon deposit and heat scale was removed. The part was not cleaned. In 15 minutes only a relatively small portion of the leaded deposit was removed.

When an exhaust system collector ring from an internal combustion engine was treated with the above caustic solution it took 3 hours to remove about 80% of the leaded deposit. Subsequent treatment with permanganate and nitric acid as in Examples 1 and 5 removes heat scale even less effectively than is described in connection with Example 2.

*Example 4*

An inner liner similarly contaminated as in Example 2 was treated under the same conditions as in Example 2 at 200–210° F. with the following reagent:

| | Percent by weight |
|---|---|
| Potassium hydroxide | 17 |
| Triethanolamine | 15 |
| Water | 68 |
| | 100 |

It took 35 minutes to remove all of the leaded deposits and only a portion of the carbon, however better than in Example 2; and on removal of heat scale even after permanganate and nitric acid treatment as in Examples 1, 2, and 5 was of the same order as in Example 2.

*Example 5*

A composition according to the invention and consisting of free potassium hydroxide, potassium salts which complex and solubilize lead ions, water, and water compatible non-volatile solvent is as follows:

| Ingredient: | Composition A, percent by weight |
|---|---|
| Potassium glycollate | 22.50 |
| Potassium acetate | 6.53 |
| Potassium hydroxide | 16.64 |
| Potassium phenoxide | 5.81 |
| Triethanolamine | 13.82 |
| Water | 34.70 |
| | 100.00 |

Uniform homogeneous compositions of this type are prepared by mixing the above ingredients, or more conveniently, in practice, by dissolving the equivalent proportion of commercial potassium hydroxide in the water-triethanolamine solvent mixture and forming the respective potassium salts by proportionate additions of the corresponding free acids, namely, glycollic acid, acetic acid, and phenol.

The scale remover composition A is heated in a suitable container or tank, constructed of stainless steel or Monel, to a temperature of 255–275° F. preferably at 270° F. plus or minus 5° F., and engine parts heavily contaminated with leaded deposits, carbon, and heat scale are immersed for a period from 15 minutes to 90 minutes in the solution. For example, an inner liner of the combustion chamber of a jet engine with a heavy deposit will be cleaned in about 15 minutes in the average case. A particularly obdurate part such as for example the aft section of the combustion chamber inner liner of a jet engine may take 90 minutes. A power recovery turbine wheel on a turboprop engine may take 90 minutes. The parts are removed and spray rinsed with a pressure spray of either cold or warm water or steam. Leaded deposits are completely removed. The amount of the heat scale and carbon removed in the above periods of time is much greater than can be obtained by the treatment employed in Examples 2 to 4 on like parts for the same period of time.

The above treatment is effective in removal of carbon deposits found in the usual case. However, as will be described below, carbon deposits are sometimes encountered in engine deposits which are not removed by the above treatment. In such case the removal may be effected by employing together with the triethanolamine or any equivalent polyalkanolmonoamine employed some polyalkanolpolyamine, as is described herein.

The above treatment removes but a portion of heat scale. However, the heat scale is placed in such condition that it may be readily removed by treatment with alkaline permanganate followed by a brightening, if desired, employing nitric acid or some retreatment with the reagent employing polyalkanolamines such as the reagent used in the removal of lead deposits, for example, the reagent first given under this example.

The part, after rinsing as described above, may be placed in a bath at temperature of 200° F. containing the following permanganate reagent:

| | Percent by weight of solution |
|---|---|
| Sodium hydroxide | 10 |
| Sodium carbonate | 10 |
| Potassium permanganate | 6 |
| Water | 74 |

The part is allowed to remain for 1 to 2 hours and after removal rinsed with warm water. The rinsed part is then immersed at ambient temperature in a nitric bath containing 25% by volume of $HNO_3$, of 70% concentration by weight, for 15 minutes to a half hour and washed. If the preliminary treatment with reagent containing the polyalkanolamines has resulted in a part cleaned of leaded deposits and carbon, the part after treatment with permanganate and nitric acid will be free of heat scale and bright and ready for inspection for flaws by the conventional penetration treatment with dyes. Where the part requires welding, the treatment results in a part which is clean and in condition for efficient welding.

Further illustrating the results obtained, an inner liner of a jet engine combustion chamber was treated with the above solution for 5–10 minutes at 270° F. and all of the leaded deposits were removed, and treatment at the above temperature for under 1 hour gave 100% removal of carbon and after treatment with permanganate as described above for 1 hour followed by 15 minutes in the nitric acid as described above gave 85% removal of the scale.

An inner liner of a second jet engine when treated with the above solution containing triethanolamine gave only 80% removal of carbon in 2 hours, the carbon being of extremely thick and of especially obdurate and resistant character.

A turbine bucket of a jet engine was treated with the above solution containing the triethanolamine at 275° F. for 1 hour and resulted in a complete carbon removal and removal of 40–50% of the scale. It was then treated with the above permanganate solution for 1 hour at 200° F. and then with $HNO_3$ solution for 15 minutes in the manner described above and 90 to 95% of the scale was removed. A second immersion in the permanganate for 30 minutes followed by the above treatment with nitric acid resulted in complete removal of heat scale.

Reciprocating engine exhaust system collector rings were treated in the above manner with the above solution A for three quarters of an hour at 270–275° F. and gave complete removal of the leaded deposits.

Example 6

The inner liner of a combustion chamber of a jet engine (fabricated from a stainless steel or a heat resistant alloy), with heavy leaded deposit and with carbon and heat scale is immersed in the composition A of Example 5 at 270° F. Lead deposits are completely dissolved and rinsed away and the carbon and heat scale deposits materially reduced after 45 to 90 minutes, the time depending on the degree of contamination. The part, after treatment with permanganate and nitric acid as described in Example 5, is cleaned in a manner equivalent to that described under Example 5.

Example 7

A combustion chamber inner liner for a jet engine contaminated in a manner equivalent to that of Example 2 was treated according to the procedure of Example 5 at 270–275° F. employing the following solution:

| | Percent by weight |
|---|---|
| Sodium hydroxide | 12 |
| Sodium acetate | 12 |
| Potassium glycollate | 15 |
| Triethanolamine | 15 |
| Water | 46 |

All of the leaded deposit was removed in 5 to 10 minutes and about half of the refractory heat scale and all of the carbon was removed after one hour treatment. Turbine buckets from a turbojet engine were treated with the above solutions at 270–275° F. and all of the carbon was removed in about 3 to 3½ hours treatment.

Stainless steel exhaust stacks of an internal combustion engine when treated in the above manner were completely cleaned of carbon by treatment for about 1½ to 2 hours.

The part after treatment with permanganate and nitric acid, as described in Example 5, is cleaned in a manner equivalent to that described under Example 5.

Example 8

A result similar to those given in Example 7 is obtained by using instead of the above composition a treating solution employing the following:

| | Percent by weight |
|---|---|
| Potassium hydroxide | 16 |
| Sodium acetate | 10 |
| Potassium glycollate | 20 |
| Triethanolamine | 12 |
| Potassium phenate (from phenol) | 6 |
| Water | 36 |

The time for removal of the carbon is somewhat shortened, the carbon being removed in less than 1 hour.

Example 9

An exhaust system collector ring with equivalent contamination to that of the rings of Example 2 was treated with a solution like the phenate containing solution of Example 8 given above except that it had 15% of NaOH instead of 16% KOH and gave complete removal of leaded deposits in 45 minutes.

TABLE III

The results obtained in the above examples may be tabulated as follows. It is to be noted that in the case where no organic high boiling solvent is employed the temperature tried was 200–210° F. being near the boiling point of the solution, and any higher temperature would cause boiling with an impractical amount of evaporation of water.

PART—JET ENGINE COMBUSTION CHAMBER INNER LINER

| Composition | Example | Temperature, °F. | Time to remove leaded deposits 100% | Time to remove carbon |
| --- | --- | --- | --- | --- |
| Caustic | 3 | 200–210 | 100% not removed in 1 hour. | Small fraction in 1 hr. |
| Caustic plus complexing agent. | 2 | 200–210 | 15 min | 5–10% in 1 hr. |
| Caustic plus alkanolamine. | 4 | 200–210 | 35 min | 25% in 1 hr. |
| Caustic plus complexing agent plus polyalkanolamine. | 7 | 270–275 | 5–10 min | 100% in 1 hr. |
| Caustic plus complexagent plus phenate plus polyalkanolamine. | 5 | 270–275 | do | 100% in less than 1 hr. |

TABLE IV

PART—RECIPROCATING ENGINE—EXHAUST SYSTEM COLLECTOR RINGS

| Composition | Example | Temperature, °F. | Time to remove 100% leaded deposit |
| --- | --- | --- | --- |
| Caustic | 3 | 200–210 | 80% in 3 hours. |
| Caustic plux complexing agent | 2 | 200–210 | 1½ hours. |
| Caustic plus complexing agent plus alkanolamine plus phenate. | 5 | 270–275 | ¾ hour. |

*Example 10*

Composition A of Example 5 is changed by replacing 3 parts by weight of triethanolamine per 100 parts of the composition with 3 parts by weight of tetra-kis N-(2-hydroxypropyl) ethylenediamine, to form a solution of composition B which is the same as composition A except that it contains 10.82% by weight triethanolamine and 3% by weight N,N,N',N'-tetra-kis (2-hydroxypropyl) ethylenediamine.

A combustion chamber inner liner covered with thick carbon deposits in the dome section of the type referred to in Example 5 is immersed in composition B at 270–275° F. for 2 hours, in the manner described in connection with Example 5, and then spray rinsed. The leaded deposit and carbon deposits are completely removed.

The part was then treated with permanganate and nitric acid in the manner described in Example 5 and resulted in a removal of 100% of heat scale compared with the 85% removed by treatment of Example 5.

An inner liner similarly contaminated to that reported in the Example 5 as giving but an 80% carbon removal when treated by the procedure and the reagent of Example 5, when treated in the same manner as in Example 5 and with the same reagent B, resulted in 100% of carbon removal after 1½ hours treatment. This may be compared with the results given in Example 5 for the similar inner liner employing the reagent of Example 5 and which gave but 80% removal after 2 hours' treatment.

A turbine bucket of a jet engine similar to that described in connection with Example 5 and similarly contaminated when treated under the same condition as given under Example 10 employing the reagent containing the polyalkanolpolyamine given above gave, after 1 hour treatment, complete carbon removal. It gave 60–65% of the scale removal compared with 40–50% as in Example 5 and after treatment with permanganate, as described in Example 5, for 1 hour and with nitric acid for 25 minutes, as in Example 5, gave complete removal of heat scale and was completely clean as compared with the 95% removal of heat scale in Example 5.

The introduction of the N,N,N',N'-tetra-kis (2-hydroxypropyl) ethylenediamine compound in composition A materially improves the decarbonizing and descaling rate of the resulting composition B.

The following table tabulates the above results:

TABLE V

| Part | Treatment | Percent C Removal | Percent Heat Scale Removed |
| --- | --- | --- | --- |
| Combustion chamber inner liner of jet engine. | Composition A (Example 5), 1 hr. | 100 | |
| | alkaline KMnO₄, 1 hr.; 25% nitric, 15 min. | | 85 |
| | Composition B (Example 10), 1 hr. | 100 | |
| | alkaline KMnO₄, 1 hr.; 25% nitric, 15 min. | | 100 |
| Do | Composition A (Example 5), 2 hrs. | 80 | |
| | Composition B (Example 10), 1½ hrs. | 100 | |
| Turbine buckets | Composition A (Example 5), 1 hr. | 100 | 40–50 |
| | alkaline KMnO₄, 1 hr.; 25% nitric, 15 min. | | 90–95 |
| | Composition B (Example 10), 1 hr. | 100 | 60–65 |
| | alkaline KMnO₄, 1 hr.; 25% nitric, 15 min. | | 100 |

It is thus seen that the use of the polyalkanolpolyamine, N,N,N',N'-tetra-kis (2-hydroxypropyl) ethylenediamine, enhances cleaning (carbon and scale removal), in a given time which is practical for production, by about 15–20%.

*Example 11*

The following are illustrative of additional scale removal compositions or solutions which can be used for removing lead, carbon or either alone or the two of them in the presence or absence of heat scale, and heat scale deposits according to the invention, with ranges as to amounts of ingredients which can be utilized being set forth for the composition.

Ingredient (percent by wt.):       Percent range
Potassium glycolate or other complex former _ 10–25
Potassium acetate _____ 2–10
Potassium hydroxide _____ 15–25
Triethanolamine _____ 12–15
N,N,N',N'-tetra-kis (2-hydroxypropyl) ethylenediamine _____ 1–3
Water, balance to _____ 100

As a specific example:

(a)

Percent by wt.
Potassium hydroxide _____ 14.0
Potassium acetate _____ 8.0
Potassium glycolate _____ 20.0
Potassium acid tartrate _____ 2.0
Triethanolamine _____ 10.0
N,N'-dihydroxyethyl ethylenediamine _____ 5.0
Water, balance to _____ 100

(b)

Potassium hydroxide _____ 15.0
Potassium acetate _____ 8.0
Potassium glycolate _____ 20.0
Triethanolamine _____ 12.5
N,N,N',N'-tetra-kis (2-hydroxypropyl) ethylenediamine _____ 2.5
Water, balance to _____ 100

(c)

Potassium hydroxide _____ 18.0
Potassium acetate _____ 10.0
Potassium glycolate _____ 20.0
N,N'-(dihydroxyethyl) ethylenediamine _____ 12.0
Water, balance to _____ 100

*Example 12*

Results similar to those of the examples employing triethanolamine are obtainable by employing a solution like that of composition of the above examples except that the triethanolamine is replaced by the same quantity of diethanolamine.

Example 13

Results similar to those of Example 10 are obtainable by employing a solution like that of composition B in the above examples except that the N,N,N',N'-tetra-kis (2-hydroxypropyl) ethylenediamine is replaced by the same amount of tetraethanol ethylenediamine or tetra-kis N,N,N',N'-(2-hydroxyethyl) ethylenediamine.

The process and compositions hereof have many advantages. Thus, my invention affords complete removal of adherent leaded deposits, complete removal of both massive and tightly adherent carbon deposits, which if left on the component part might result in damage to the alloy due to carbide formation and precipitation, and complete removal or such extensive removal of heat scale and conditioning of the remainder of the heat scale to render the latter susceptible to easy removal by simple chemical follow-up cleaning such as permanganate solution treatment, whenever necessary.

Other advantages include: Rapid removal of leaded deposits on (a) hot parts of jet engines; (b) exhaust sections of turboprop-, turbojet-, and prop-driven aircraft; and power recovery turbine unit (PRT unit) of reciprocating type engines. It has long tank life, and effective performance during life of bath, when used to remove the stubborn leaded deposits. It is applicable to a wide variety of stainless steels, heat resistant alloys, and super-alloys, without incurring measurable chemical attack and without causing corrosion or dimensional loss of these metals. The versatile and extensive cleaning action is achieved by this process by simple immersion in a heated chemical bath and is far superior to elaborate and only partially effective mechanical methods of cleaning, such as grit blasting or vapor blasting. Clean surfaces of metal components are produced, suitable for inspection by production-line methods utilizing penetrant dyes or fluorescent materials.

In formulating the compositions of my invention and in the performance of the processes of my invention, I may, but need not, employ the chemical compounds described or referred to in the specification in their chemically pure state. Commercially available compounds may be employed. These frequently contain admixed therewith some proportion of other compounds which are not separated therefrom in the process of manufacture. These compounds are frequently referred to as technical grade to distinguish them from the chemically pure compounds. Provided these impurities present in the technical grades do not alter the physical and chemical properties of the compound in question, such technical grades may be used. For example, technical grade polyols and technical grade polyalkanolamines may be employed to adjust the boiling point of the solution provided the technical grade has suitable boiling point and vapor pressure limits and compatibility described above, and in the case of the polyalkanolamines do not interfere with the chemical reactivity and solvent properties described above. Thus, for example, commercially available technical grade trialkanolamines may include about 5% monoethanolamine and some will contain other polyalkanolamines such as diethanolamine or polyethoxyethanolamine and analogues higher than triethanolamine. In the same manner, technical grade polyalkanolpolyamines may contain amines and alkanolmonoamines. All these are included as alternatives to the pure compound.

In all of the preceding examples and uses there may be added to the treating solution suitable wetting agents which are stable in the alkaline solution such as anionic wetting agents, such as soaps, sodium salts of the fatty acids or of the sulfonated fatty acids, salts of the petroleum sulfonates and of the alkyl aryl sulfonates, or any other alkali stable wetting agent of which the art has many examples, as will be understood by those skilled in this art.

The process and compositions of this invention are also applicable to the removal of heat scale in the absence of carbon deposits. Thus, heat scale generated on stainless steel or other alkali resistant metals during heat treating of the metal at high temperatures may be removed in the same manner as described above for the removal of heat scale, particularly as described in connection with Examples 5 and 10–13, inclusive.

The compositions of my invention may be packaged in an anhydrous condition and dissolved in water to make the treating baths and in said case this invention includes mixtures not in water solution, as well as the novel water solutions thereof. The weight percentage of the various components in the anhydrous mixtures are readily ascertainable from the data previously given by simple arithmetical calculation.

The solutions described above may be repeatedly used in the procedures described. After cleaning of the metallic parts the solutions may be repeatedly used on other metallic pieces to be cleaned according to this invention. The partially spent solutions may be fortified by adding additional ingredients to maintain their concentration within the ranges specified, and the fortified solution employed in the above procedures. While the solutions have been described above according to their content when freshly compounded for use according to this invention, this description does not exclude the possibility that transformations during use may occur. Thus, for example, oxidation of the alkanolamines to the corresponding carboxylates may occur in part, and thus the ingredients of the solution be changed in some respects during use without substantially impairing the utility of the solutions for the uses described. Such used solutions are within the scope of the invention disclosed and claimed herein.

While I have described a particular embodiment of my invention for purposes of illustration, it should be understood that various modifications and adaptations thereof may be made within the spirit of the invention as set forth in the appended claims.

The invention claimed is:

1. A composition which is suitable for removal of combustion deposits from engine component parts, and which consists essentially of from about 4 to about 40 parts by weight of an alkali metal hydroxide, from about 1 to about 45 parts by weight of a metal complexing agent chosen from the group consisting of the water soluble alkali metal salts of an aliphatic hydroxy acid and the water soluble alkali metal salts of a fatty acid of less than four carbon atoms, said aliphatic hydroxy acid being chosen from the group consisting of lactic acid, citric acid, tartaric acid, gluconic acid, glyceric acid, malic acid, glycolic acid, and saccharic acid, and from about 1 to about 30 parts by weight of a mixture of polyalkanolmonoamine wherein each of the alkanol chains comprises from one to about four carbon atoms and said polyalkanolmonoamine has a boiling point in excess of about 400° F. and an alkali soluble and alkali stable polyalkanolpolyamine wherein each of the alkanol chains comprises from one to about three carbon atoms and said polyalkanolpolyamine has a boiling point in excess of about 400° F., in said mixture of polyalkanolpolyamine and polyalkanolmonoamine the weight ratio of the polyalkanolpolyamine to the polyalkanolmonoamine being approximately from 1/22 to approximately 5/9.

2. A composition as set forth in claim 1 containing also up to about 80 parts by weight of water.

3. A composition as set forth in claim 1 wherein said polyalkanolmonoamine is chosen from the group consisting of diethanolamine, triethanolamine, N-methyl diethanolamine, N-ethyl diethanolamine, diisopropanolamine, triisopropanolamine, N,N-dihydroxyethyl glycine, glycol and polyglycol derivatives of triethanolamine, and polyetherglycol derivatives of triethanolamine; and said polyalkanolpolyamine is chosen from the group consisting of N,N,N',N'-tetra-kis (2-hydroxyethyl) ethylenediamine, N,N,N',N'-tetra-kis (2-hydroxypropyl) ethylenediamine, N,N'-dihydroxyethyl ethylenediamine, tetraethanol propylenediamine, pentaethanol diethylenetriamine, and hexaenthanol triethylenetetramine.

4. A composition which is suitable for removal of combustion deposits from engine component parts, which consists essentially of from about 10 to about 25 parts by weight of an alkali metal hydroxide, from about 1 to about 45 parts by weight of a metal complexing agent chosen from the group consisting of the water soluble alkali metal salts of an aliphatic hydroxy acid and the water soluble alkali metal salts of a fatty acid of less than four carbon atoms, said aliphatic hydroxy acid being chosen from the group consisting of lactic acid, citric acid, tartaric acid, gluconic acid, glyceric acid, malic acid, glycolic acid, and saccharic acid, and from about 10 to about 25 parts by weight of a mixture of polyalkanolmonoamine wherein each of the alkanol chains comprises from one to about four carbon atoms and said polyalkanolmonoamine has a boiling point in excess of about 400° F. and an alkali soluble and alkali stable polyalkanolpolyamine wherein each of the alkanol chains comprises from one to about three carbon atoms and said polyalkanolpolyamine has a boiling point in excess of about 400° F., in said mixture of polyalkanolpolyamine and polyalkanolmonoamine the weight ratio of the polyalkanolpolyamine to the polyalkanolmonoamine being approximately from 1/22 to approximately 5/9, said polyalkanolmonoamine and polyalkanolpolyamine being dispersible and stable in alkaline solution at 200 to 300° F.

5. A composition as set forth in claim 4 containing about from 20 to 40 parts by weight of water.

6. A composition as set forth in claim 4, wherein said polyalkanolmonoamine is chosen from the group consisting of diethanolamine, triethanolamine, N-methyl diethanolamine, N-ethyl diethanolamine, diisopropanolamine, triisopropanolamine, N,N-dihydroxyethyl glycine, glycol and polyglycol derivatives of triethanolamine, and polyetherglycol derivatives of triethanolamine; and said polyalkanolpolyamine is chosen from the group consisting of N,N,N',N'-tetra-kis (2-hydroxyethyl) ethylene diamine, N,N,N',N'-tetra-kis (2-hydroxypropyl) ethylenediamine, N,N'-dihydroxyethyl ethylenediamine, tetraethanol propylenediamine, pentaethanol diethylenetriamine, and hexaethanol triethylenetetramine.

References Cited in the file of this patent

UNITED STATES PATENTS

| | | |
|---|---|---|
| 1,049,054 | Coombs | Dec. 31, 1912 |
| 1,789,789 | Lovell | Jan. 6, 1931 |
| 2,254,492 | Orozco | Sept. 2, 1941 |
| 2,396,938 | Bersworth | Mar. 19, 1946 |
| 2,408,096 | Pierce et al. | Sept. 24, 1946 |
| 2,544,649 | Bersworth | Mar. 13, 1951 |
| 2,567,835 | Alquist | Sept. 11, 1951 |
| 2,584,017 | Dvorkovitz et al. | Jan. 29, 1952 |
| 2,626,879 | Lazar | Jan. 27, 1953 |
| 2,673,842 | Brown | Mar. 30, 1954 |
| 2,691,636 | Stayner | Oct. 12, 1954 |
| 2,739,883 | Newman | Mar. 27, 1956 |
| 1,777,818 | Gambill | Jan. 15, 1957 |

OTHER REFERENCES

Chem. Form. by Bennett, vol. VIII, pages 281, 349, 351, Chem. Pub. Co., Brooklyn (1948).

Versenes Tech. Bull., No. 2, Sec. I pages 17, 19, 21, 23, Sec. II, pages 37–39, Bersworth Chem. Co., Framingham, Mass. (1952).

Sequestrene, pages 2–12 and 36, Geigy Chem. Corp. N.Y. (1952).

Mehltretter et al.: Ind. Eng. Chem., December 1953, pp. 2782–2784.